United States Patent [19]

Appleton et al.

[11] 4,190,222
[45] Feb. 26, 1980

[54] ELECTRICAL CABLE CONNECTOR WITH CAM LOCK

[75] Inventors: Arthur I. Appleton, Indian Creek Village, Fla.; Jon L. Liljequist, Mount Prospect; Carlos J. Ylagan, Glendale Heights, both of Ill.

[73] Assignee: Appleton Electric Company, Chicago, Ill.

[21] Appl. No.: 879,347

[22] Filed: Feb. 21, 1978

[51] Int. Cl.$^2$ .............................................. F16L 5/00
[52] U.S. Cl. .................................. 248/56; 174/65 G; 174/153 G; 285/162; 339/103 R
[58] Field of Search .......... 248/56; 174/65 G, 153 G; 339/103 R, 103 B, 103 C, 103 M, 101; 16/2; 285/162; 403/197; 85/45

[56] References Cited

U.S. PATENT DOCUMENTS

| 375,206 | 12/1887 | Shelton | 85/45 |
|---|---|---|---|
| 646,781 | 4/1900 | Wyatt | 85/45 |
| 2,093,026 | 9/1937 | Bernhard | 85/45 |
| 2,973,212 | 2/1961 | Rose | 285/162 X |
| 3,366,356 | 1/1968 | Fisher | 174/153 G X |
| 3,424,856 | 1/1969 | Coldren | 174/153 G |
| 3,493,205 | 2/1970 | Bromberg | 248/56 |
| 3,689,014 | 9/1972 | Fink | 248/56 |
| 3,788,582 | 1/1974 | Swanquist | 248/56 |
| 4,000,875 | 1/1977 | Jemison et al. | 248/56 |
| 4,056,252 | 11/1977 | Simon | 248/56 |
| 4,108,507 | 8/1978 | Renner et al. | 339/103 R X |

FOREIGN PATENT DOCUMENTS

| 540137 | 4/1957 | Canada | 285/162 |
|---|---|---|---|
| 994443 | 8/1976 | Canada | 174/153 G |
| 2132758 | 1/1973 | Fed. Rep. of Germany | 174/153 G |
| 152065 | 10/1955 | Sweden | 248/56 |

*Primary Examiner*—Rodney H. Bonck
*Attorney, Agent, or Firm*—Jon L. Liljequist

[57] ABSTRACT

An electrical cable connector for use in a knockout opening of an electrical box or the like includes a cam element with a slot therein arranged to receive the tip of a screwdriver transverse of its rotational axis so as to permit the application of a significant torque on the cam with a minimal force to thereby securely wedge the cable in the connector body and prevent its removal. This connector features a tubular body with an enlarged inner end to permit its installation into a knockout opening from the inside of the box, an integrally molded pressure pad opposite the cam element to permit the connector to accommodate several sizes of cable, and snap locks designed to defeatably hold the cam element selectively either in its open or its locked positions.

4 Claims, 12 Drawing Figures

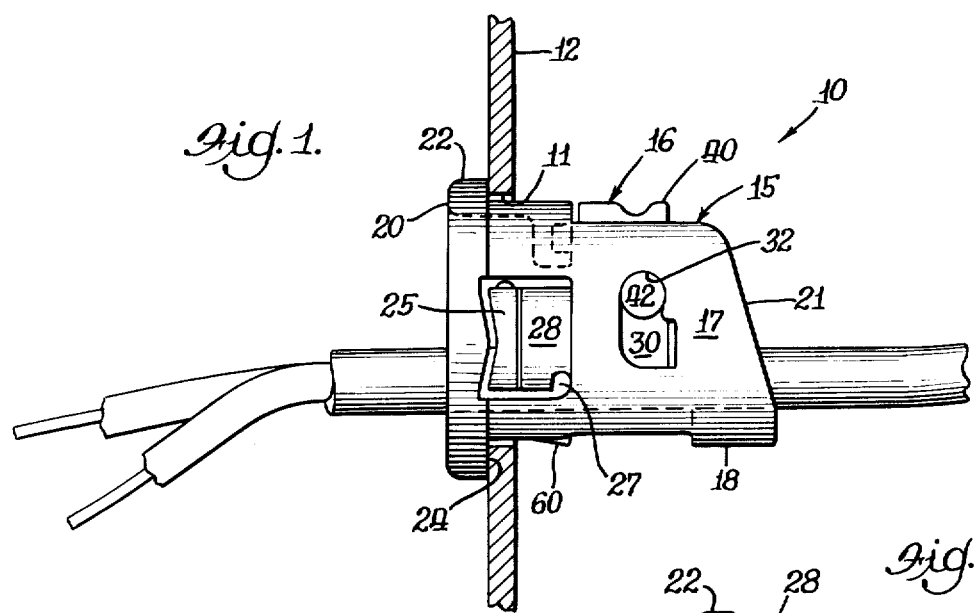
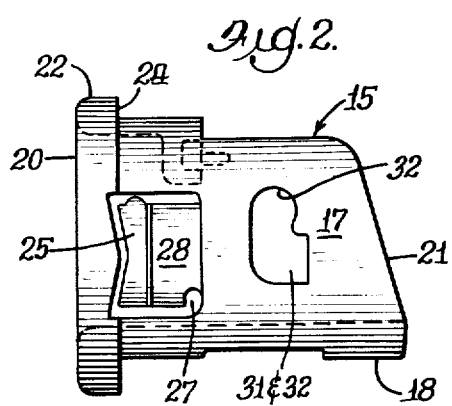
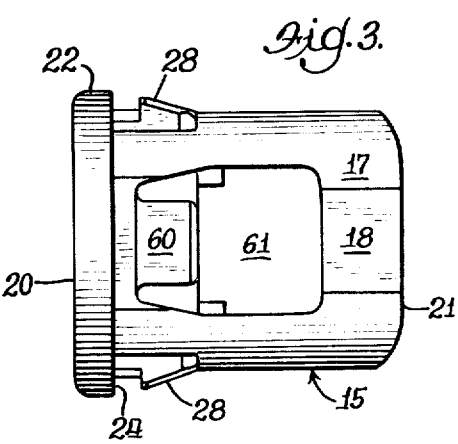
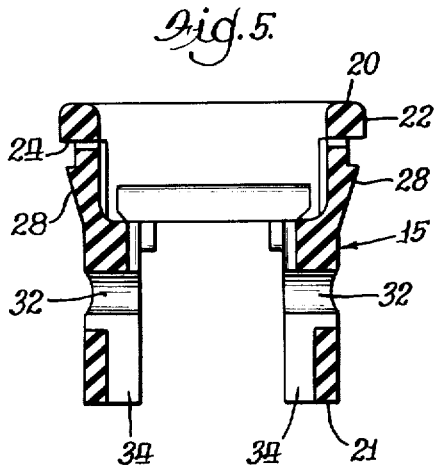
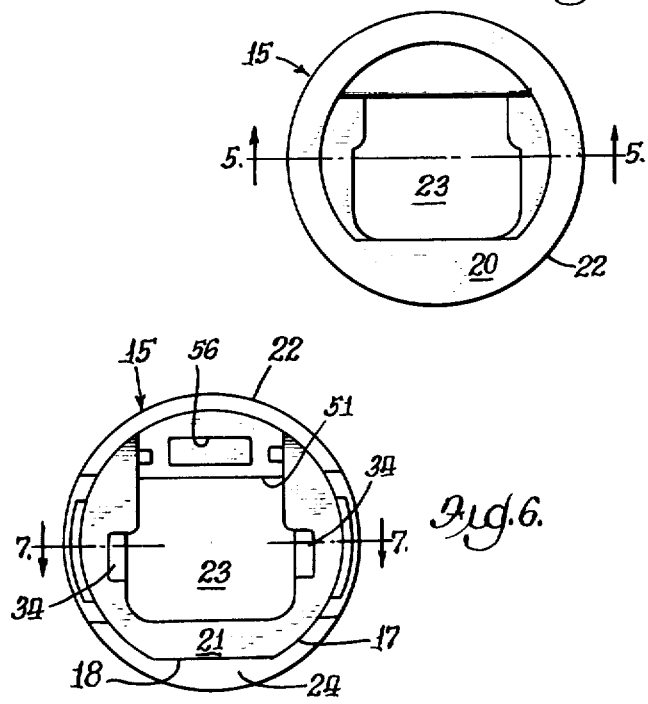

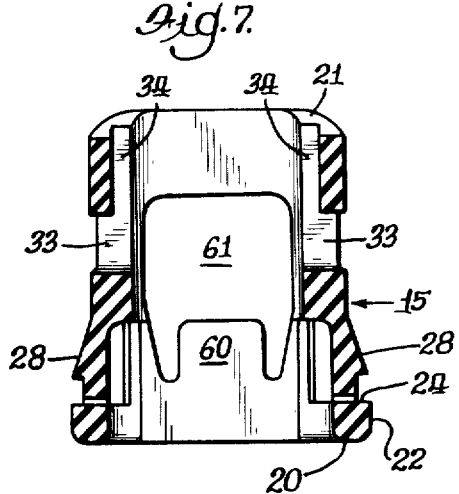
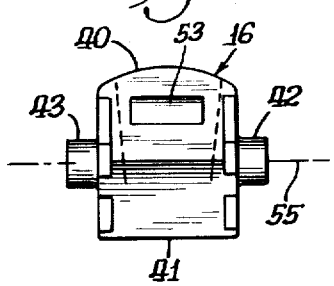
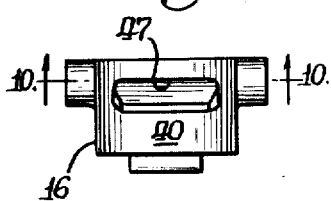
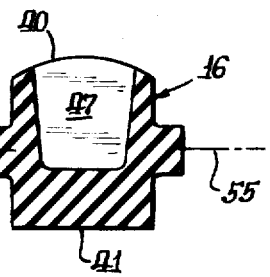
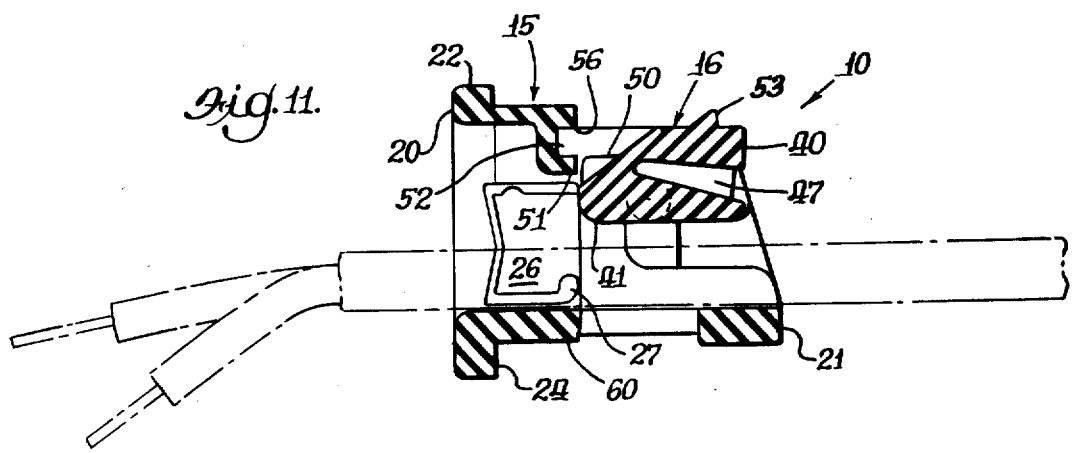
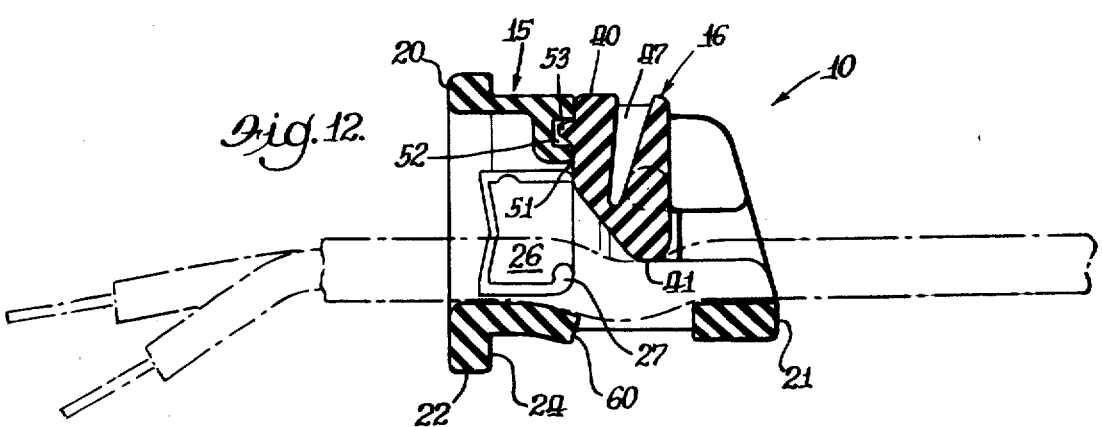

ELECTRICAL CABLE CONNECTOR WITH CAM LOCK

BACKGROUND AND SUMMARY OF THE INVENTION

Recently there has arisen a growing demand for low cost nonmetallic connectors of simplified design. Because injection molded thermoplastics can be produced cheaply, at least several such connectors have been patented and now appear in the marketplace. One of these is shown in U.S. Pat. No. 3,493,205 to Bromberg, and another is shown in U.S. Pat. No. 3,788,582 to Swanquist. Each of these two designs represent improvements in the state of the art, but each includes certain limitations which have precipitated the present invention. The first of the above described connector patents discloses a connector device or "bushing" comprising a tubular body with tethered clamping means in the form of a "plug". After a cable is threaded through the tubular body, this plug is pressed through a transverse opening in the tubular body into compressive contact against the side of the cable so as to wedge the cable and connector together. In the field, this driving of the plug is normally accomplished with channel-lock pliers or the like.

The other patent mentioned above discloses a two-piece connector comprising a tubular body carrying transversely therethrough a separate but captivated cam element. An enlarged end of the cam element protrudes outside of the tubular body and carries thereon both a hex head and a screw slot of rotating it into compressive contact with a cable extending axially through the connector body. The screwdriver slot extends axially into this enlarged end of the cam element, and thus a limited amount of torque can be applied to the cam element with a screwdriver, this being the usual tool used to attach the cable to the connector in the commercial form of the invention.

Both of these prior art connectors are designed to be pushed into a knockout opening in an electrical box from the outside of that electrical box. When used for "old work" (installation of new electrical lines in an old structure) this presents the dilemma of either ripping away part of the interior wallboard surrounding the electrical box in order to mount the connector into the box from its outside, or alternatively, the connector must be mounted into a knockout opening from the inside of the box, in which case the bulk of the connector is inside the box and limits the available space therein.

In the present invention, the connector is both designed and intended to be mounted into a knockout opening from the inside of the box for both new work and old work. Because the bulk of the connector when mounted is outside the electrical box, except for a thin but solid flange at its interior end, it will both withstand a considerable pullout force as well as consume a minimum of the interior box volume. This connector carries a cam element with a slot therein arranged to receive a screwdriver or the like transverse of its axis to exert a considerable mechanical advantage on the cam resulting in a significant wedging effect on the cable with a minimum of effort on the part of the installer. The uncertainty of prior art connectors as to when the clamping means are completely or securely "driven home" against the cable is eliminated because the cam element of this invention makes an audible "click" after it has been rotated approximately 90° from its open position to its locked position, this 90° rotation being the same for a wide range of cables. To facilitate installation, the tubular body interferes slightly with the rotation of the cam element away from its "open" position so that it is held in that position from the time it leaves its place of manufacture until it is rotated into its "locked" position against the cable by its ultimate user. In order to achieve uniform clamping of cables of different thicknesses, a deformable pressure pad is provided opposite the cam element. The thicker the cable, the more the pad deforms.

DESCRIPTION OF THE DRAWINGS

FIG. 1 is a side view of a connector embodying the principles of the present invention, this connector being mounted through the knockout opening of a portion of a sheet metal electrical box (shown in cross section) and having a conductor or cable extending therethrough and being clamped thereby, FIG. 2 is a side view of only the tubular main body of the connector shown in FIG. 1, FIG. 3 is a plan view of the tubular main body shown in FIG. 2, FIG. 4 is an inner end view of the tubular main body shown in FIGS. 2 and 3, the inner end being that end normally residing inside the electrical box, FIG. 5 is a cross sectional view taken substantially along the lines 5—5 of FIG. 4, FIG. 6 is an outer end view of the tubular main body, FIG. 7 is a cross sectional view taken substantially along the lines 7—7 of FIG. 6, FIG. 8 is a front view of the cam element when upright in its locking position corresponding to FIG. 1 and FIG. 12, FIG. 9 is an end view of the cam element shown in FIG. 8, but with its upper end rotated 90° so as to be looking into the elongated slot therein, FIG. 10 is a cross sectional view of the cam element taken substantially along the lines 10—10 of FIG. 9, FIG. 11 is a side view of the tubular main body and cam element assembly in cross section with an electric cable extending therethrough (shown in dashed lines) prior to rotating the cam into locking engagement with the cable, and FIG. 12 is also a cross sectional side view similar to FIG. 11, but with the cam rotated in its closed or locked position.

DESCRIPTION OF SPECIFIC EMBODIMENT

Referring now to the drawings, there is shown a two-piece electrical cable connector designated generally as 10. Electrical cable connector 10 mounts in a knockout opening 11 of an electrical box 12 and provides both a physical attachment to the box as well as a protected passageway for an electrical conductor or cable 13 into the interior of the box. Electrical cable connector 10 includes a tubular main body 15 and compression means in the form of a cam element 16.

Tubular main body 15 includes a substantially cylindrical outer surface 17 having a diameter slightly less than the diameter of the knockout opening 11 in which it is mounted. That which is shown as the lowermost portion 18 of surface 17 is in fact flattened because some knockouts, when removed, do not leave a perfectly round hole.

Tubular body 15 extends axially from an inner end 20 to an outer end 21. Inner end 20 carries attachment means for attaching or locking the connector to the electrical box, and herein these means include a flange 22 with an outer diameter enlarged beyond that of both outer surface 17 of the connector as well as knockout opening 11 so as to form a shoulder 24 that abuts the inner surface of the electrical box around the knockout opening and prevents the tubular main body 15 from completely passing through knockout opening 11 when the connector is installed.

Extending axially and entirely through tubular body 15 is a passageway 23, perhaps best seen in FIGS. 4 and 6. Passageway 23 provides the means by which cable 13 enters the electrical box.

Provision is made on opposite sides of the tubular main body 15 for holding the connector in the knockout opening against flange 22 after it has been fully inserted therein. Herein this provision comprises the rest of the attachment means in the form of ear shaped flexure members 25 and 26 formed by a generally C-shaped slot 27 extending entirely through the sidewall of the tubular body from outer surface 17 to passageway 23. The distal end of flexure members 25 and 26 is flexible radially of the tubular body and includes a combination cam and lock finger 28 at its distal end which depresses radially inwardly as it cams against the edges of the knockout opening as the connector approaches its fully inserted position. Just before shoulder 24 contacts the inner surface of the electrical box, fingers 28 pass beyond contact with the knockout opening edges and are free to resiliently snap radially outwardly to their free position to thereby captivate the connector to the electrical box.

Situated between flexure means 25, 26 and outer end 21 of the tubular body 15 are a pair of openings 30, 31 which also extend entirely through the tubular body and which are also diametrically opposed therein. One end 32 of openings 30, 31 is circular over an arc of perhaps 190° to provide a bearing surface for mating portions of the cam element 16, to be described in detail later. The other end 33 of openings 30 and 31 communicate with internal, longitudinal grooves 34 which provide sufficient relief in tubular main body 15 (see FIGS. 5 and 6) so that cam element 16 has clearance to get to and be inserted into its assembled location (see FIGS. 1, 11 and 12). Circular arc portion 32 of openings 30 and 31 exceeds 180° so that the cam element 16 will be captivated thereby after being snapped into place.

Referring now to cam element 16, this element includes a driving end 40, a camming or compression end 41, a pair of short, cylindrical shafts 42 and 43 jutting out from opposite sides 45 and 46 of the cam element, and a deep slot 47 extending into driving end 40 of the cam for receiving a flat end tool such as a screwdriver. When the cam element 16 is properly assembled into tubular main body 15, shafts 42 and 43 reside in the circular arc portions 32 of openings 30 and 31, as can best be seen in FIG. 1.

As will be understood, cam element 16 is rotatable between a first or open position as seen in FIG. 11, and a closed or compression position, as seen in FIGS. 1 and 12. At the time of original assembly, or shortly thereafter, cam element 16 is rotated to its fully open position where it is held by defeatable interference means in the form of a pair of laterally spaced small protrusions 50 on cam element 16 that interfere with a ledge 51 in tubular body 15. When cam element 16 is in its open position, (see FIG. 11), ledge 51 prevents rotation of the cam element toward its closed position until a sufficient turning effort is applied to overcome this slight interference. This feature is provided to keep the connector open and ready to accept a cable therethrough for the convenience of its user.

Cooperating means are also provided on the cam element and tubular body 15 to indicate to the user when he has fully rotated the cam element 16 to its closed position. Herein these cooperating means take the form of a depression 52 in the tubular body and a large protrusion 53 on cam element 16. When cam element 16 is in its fully locked position as shown in FIG. 12, large protrusion 53 resides in depression 52. However, the distance from the axis of rotation 55 of the cam to the outermost surface of large protrusion 53 is slightly greater than the distance from the axis of rotation 55 of the cam to the outermost (both radially and axially) corner 56 defining depression 52. Thus there is a slight interference between large protrusion 53 and corner 56 when they pass over one another which both makes an audible "click" as the cam is rotated into its fully closed position and which also tends to hold the cam element 16 locked in that closed position once there.

In order to accommodate a variety of sizes of cable, main tubular body 15 includes deformation means in the form of a flexible pressure pad 60 extending in cantilever fashion out into an enlarged opening 61 located across passageway 23 from ledge 51. While relatively thin cables are compressed under the rotation of cam 16 so as to deform only into enlarged opening 61 and only to a relatively small degree, thicker cables are pushed further down and thus deflect pressure pad 60 to whatever extent is needed to permit cam element 16 to rotate to its fully closed position. Thus a variety of cable sizes can be uniformly held with a single size connector.

In use, and for "new" work, the connector 10 is inserted through a knockout opening from the inside of the electrical box which causes fingers 28 to depress by a camming action until just before shoulder 24 engages the inside surface of the electrical box, at which time fingers 28 snap out and captivate the connector. An electrical conductor or cable is then inserted through passageway 23 until the desired amount of cable is exposed inside the box. A screwdriver is then inserted into slot 47 and rotated about 90°, at which time an audible "click" will be noted. This completes the installation.

In the event the connector is used with "old" work, the cable is fished through a knockout opening, the connector is slipped over the free end of the cable, a screwdriver is used to rotate the cam element and lock the connector to the cable, and then the connector cable combination is snapped in place in the knockout opening from the inside of the box.

The above disclosure is offered for public dissemination in return for the grant of a patent. Although it is detailed to ensure adequacy and aid understanding, this is not intended to prejudice that purpose of a patent which is to cover each new invented concept therein no matter how others may later disguise it by variations in form or additions or further improvements. And although the disclosure principally makes reference to a "cable" being used with the connector, it will be understood that that term was used for convenience and that the connector is usable with a single conductor as well as multiple conductor arrangements. Finally, while the illustrated embodiment utilizes a cam element that rotates a total of 90° between its fully open and fully closed positions, it will be appreciated that this specific angle is somewhat a matter of design choice. Other angles between about 45° and 120° would also produce reasonably well working designs.

We claim:

1. An electrical cable connector for fixedly securing at least one electrical conductor to an electrical box and for providing a protected pathway into the inside of the box through an opening therein, comprising:

a tubular main body having an inner end and an outer end, said tubular body being of lesser diameter than said opening over most of its length including its outer end to permit most of said main body from outer end to inner end to pass through said opening from the interior to the exterior of the box, a passageway extending axially through said body for protectively channeling said conductor into said box, flange means on said body proximate its inner end extending sufficiently radially outwardly from said tubular body to engage the inside of said box around said opening for preventing said tubular body from freely passing entirely through said opening from the interior of the box to the exterior of the box, locking means between said flange means and said outer end for holding said flange adjacent said opening, and separate and movable compression means interfitting with said tubular body between said locking means and said outer end for fixedly clamping said conductor to said connector, said compression means being contained entirely within said lesser diameter to permit passage thereof through said box opening during installation of said connector into said box said compression means including a cam having an axis extending transversely of said passageway and journalled in said tubular body, said cam being rotatable between a first position, wherein said passageway is unobstructed to passage of said conductor therethrough, and a second position at least partially blocking said passageway, whereupon movement of the cam from its first position to its second position when the conductor is in the passageway effects a clamping of the conductor to the connector, said compression means also including slot means therein for receiving the slender end of an elongate implement to facilitate moving it from its first position to its second position, said slot extending into said cam in a direction transverse of said axis so that the length of said implement can be utilized to exert a considerable turning effort thereon.

2. The connector as set forth in claim 1, wherein said tubular body includes cantilevered deformation means disposed diametrically opposed from said compression means for providing reasonably uniform flexible resistance to said compression means and permitting a wide range of conductor sizes to be accommodated through said passageway.

3. The electrical connector as set forth in claim 1, including cooperating means on said cam and on said tubular body for locking said cam in its second position and also including a protrusion on one of said cam and said tubular body for releasably holding said cam at its first position whereupon the connector can be installed with said cam in its first position and with its passageway open and ready to receive the cable therethrough.

4. In a plastic electrical cable connector for securing a non-metallic sheathed cable to a thin-wall electrical box through a knockout opening therein, said connector including a tubular body providing a protected passageway for said cable into said box, and also including locking means for locking said tubular body to said box, the improvement comprising:

a plastic cam element journalled in said tubular body on an axis extending transversely of said passageway, said cam element including a pair of cylindrical shafts jutting out from opposite sides of the cam element upon which said cam element rotates, said cam element also including a driving end and a compression end with deep slot means extending into the driving end between and in a direction transverse of said shafts for receiving the flat end of a screwdriver and permitting the length of said screwdriver to act as an elongate moment arm for permitting a considerable torque to be applied to said cam element while distributing the load on said cam element over the relatively large surface area of the screwdriver's flat end.

* * * * *